(12) United States Patent
Demers et al.

(10) Patent No.: US 7,786,699 B2
(45) Date of Patent: Aug. 31, 2010

(54) POWER SUPPLY CHARGER AND METHOD OF CHARGING

(75) Inventors: Remi Demers, Saint-Romuald (CA); Stephane Bedard, Saint-Augustin-de-Desmaures (CA); Michael Poulin, Ancienne-Lorette (CA)

(73) Assignee: Victhom Human Bionics, Inc., Quebec (CA)

( * ) Notice: Subject to any disclaimer, the term of this patent is extended or adjusted under 35 U.S.C. 154(b) by 308 days.

(21) Appl. No.: 11/339,742

(22) Filed: Jan. 25, 2006

(65) Prior Publication Data

US 2006/0164038 A1 Jul. 27, 2006

Related U.S. Application Data

(60) Provisional application No. 60/646,528, filed on Jan. 25, 2005.

(51) Int. Cl.
*H02J 7/00* (2006.01)
(52) U.S. Cl. .................. 320/133; 320/116; 320/124; 320/136; 320/162
(58) Field of Classification Search ............... 320/116, 320/119, 120, 153, 162, 133; 324/432, 433
See application file for complete search history.

(56) References Cited

U.S. PATENT DOCUMENTS

| | | | |
|---|---|---|---|
| 5,153,496 A | 10/1992 | LaForge | |
| 5,387,857 A * | 2/1995 | Honda et al. | 320/120 |
| 5,412,305 A * | 5/1995 | Jeanneret | 320/119 |
| 5,422,558 A | 6/1995 | Stewart | |
| 5,504,415 A | 4/1996 | Podrazhansky et al. | |
| 5,637,981 A * | 6/1997 | Nagai et al. | 320/160 |
| 5,656,915 A | 8/1997 | Eaves | |
| 5,677,613 A | 10/1997 | Perelle | |
| 5,982,156 A | 11/1999 | Weimer et al. | |
| 5,998,930 A | 12/1999 | Upadhyay et al. | |
| 6,043,628 A * | 3/2000 | Perelle et al. | 320/119 |
| 6,061,577 A | 5/2000 | Andrieu et al. | |
| 6,172,505 B1 * | 1/2001 | Bertness | 324/430 |

(Continued)

FOREIGN PATENT DOCUMENTS

EP 0718951 A1 6/1996

(Continued)

*Primary Examiner*—Edward Tso
*Assistant Examiner*—Arun Williams
(74) *Attorney, Agent, or Firm*—Knobbe Martens Olson & Bear, LLP (57) ABSTRACT

A power supply charger for charging battery cells divided into at least two battery cell groups, each battery cell group having an associated protector circuit module. The power supply charger comprises, for each battery cell group, a power converter, a constant-current and constant-voltage device connected to the power converter for selectively applying a voltage from the power converter across the battery cell group and a current sensing circuit. The power supply charger further comprises, for each battery cell of a battery cell group, a voltage sensing circuit and a balancer circuit. Finally, the power supply charger comprises a micro-controller operatively connected to the various components and is so configured as to, for each battery cell group, selectively apply a voltage across the battery cell group or decrease the voltage of individual battery cells in the battery cell group in response to sensed battery cell voltage and battery cell group current.

42 Claims, 6 Drawing Sheets

U.S. PATENT DOCUMENTS

| | | | |
|---|---|---|---|
| 6,184,656 B1 * | 2/2001 | Karunasiri et al. | 320/119 |
| 6,194,867 B1 * | 2/2001 | Cummings et al. | 320/119 |
| 6,208,117 B1 * | 3/2001 | Hibi | 320/134 |
| 6,225,780 B1 * | 5/2001 | Koch | 320/118 |
| 6,249,125 B1 * | 6/2001 | Haddad et al. | 324/426 |
| 6,268,710 B1 * | 7/2001 | Koga | 320/116 |
| 6,294,897 B1 * | 9/2001 | Champlin | 320/153 |
| 6,304,059 B1 * | 10/2001 | Chalasani et al. | 320/118 |
| 6,326,767 B1 * | 12/2001 | Small et al. | 320/116 |
| 6,362,626 B2 * | 3/2002 | Furukawa | 324/429 |
| 6,373,152 B1 | 4/2002 | Wang et al. | |
| 6,373,222 B2 * | 4/2002 | Odaohhari | 320/116 |
| 6,411,829 B1 * | 6/2002 | Takenaka | 455/573 |
| 6,451,481 B1 | 9/2002 | Lee et al. | |
| 6,511,764 B1 * | 1/2003 | Marten | 429/7 |
| 6,563,291 B2 * | 5/2003 | Tamura et al. | 320/116 |
| 6,806,685 B2 * | 10/2004 | Suzuki et al. | 320/116 |
| 6,891,354 B2 * | 5/2005 | Fazakas | 320/137 |
| 7,148,654 B2 * | 12/2006 | Burany et al. | 320/120 |
| 7,193,391 B2 * | 3/2007 | Moore | 320/116 |
| 7,230,352 B2 | 6/2007 | Bedard et al. | |
| 7,321,220 B2 * | 1/2008 | Plett | 320/128 |
| 2001/0000423 A1 * | 4/2001 | Fischer et al. | 320/114 |
| 2002/0024319 A1 * | 2/2002 | Haraguchi et al. | 320/122 |
| 2002/0167291 A1 | 11/2002 | Imai et al. | |
| 2003/0052644 A1 * | 3/2003 | Nelson et al. | 320/107 |
| 2004/0049290 A1 | 3/2004 | Bedard | |
| 2004/0111163 A1 | 6/2004 | Bedard et al. | |
| 2004/0135544 A1 * | 7/2004 | King et al. | 320/116 |
| 2004/0189248 A1 * | 9/2004 | Boskovitch et al. | 320/116 |
| 2004/0247996 A1 * | 12/2004 | Smith et al. | 429/86 |
| 2004/0263127 A1 | 12/2004 | Turner et al. | |
| 2005/0105226 A1 | 5/2005 | Bedard et al. | |

FOREIGN PATENT DOCUMENTS

| | | |
|---|---|---|
| EP | 0902547 A2 | 3/1999 |
| EP | 1107420 A2 | 6/2001 |
| FR | 2816463 | 5/2002 |
| WO | WO03/088373 A2 | 10/2003 |

* cited by examiner

POWER SUPPLY CHARGER AND METHOD OF CHARGING

CROSS-REFERENCE TO RELATED APPLICATION

The present application claims the benefits of U.S. provisional patent application No. 60/646,528 filed Jan. 25, 2005, which is hereby incorporated by reference.

TECHNICAL FIELD

The present invention relates to a power supply charging method and device.

BACKGROUND

A power supply, or battery, is formed of individual cells, each of which produces a voltage and current output. The cells are arranged in series and/or parallel arrays to form a power supply that is capable of producing the required voltage and current outputs suitable for applications such as power tools, hobby planes, race carts and actuated prostheses, to name a few.

When a series of cells, such as lithium-ion cells, are charged and discharged many times, a voltage difference may appear between the cells. When the cells are thus unbalanced, a voltage beyond the rated voltage may develop across a cell resulting in possible failure of the power supply.

Accordingly, it is an object of the present application to obviate or mitigate some or all of the above disadvantages.

SUMMARY

The present invention relates to a method of charging a power supply having a predetermined number of battery cells divided into at least two battery cell groups, the method comprising the steps of:
  a—for each battery cell group, applying a voltage across the battery cell group until one condition selected from the group consisting of the voltage of a battery cell exceeding a first threshold and the current of the cell group dropping below a second threshold, is met;
  b—verifying that each of the predetermined number of battery cells has a similar voltage;
  c—when the verification of the battery cells voltage in step b determines that at least one battery cell has a voltage departing from the voltage of the other battery cells by more than a predetermine value, decreasing the voltage of the other cells and returning to step a.

The method of charging a power supply may further comprise the step of:
  d—for each battery cell group, applying a voltage across the battery cell group until the current of the battery cell group drops below a third threshold and stays below the third threshold for a predetermined period of time.

The present invention also relates to a power supply charger for charging a power supply having a predetermined number of battery cells divided into at least two battery cell groups, the power supply charger comprising:
  a power source input configured to be connected to a power source;
  at least two power converters connected to the power input and associated with the at least two battery cell groups, respectively, each of the at least two power converters being associated with a switching controller, a current sensing circuit, a voltage sensing circuit and a balancer circuit;
  each of the at least two power converters being provided with terminals configured to be connectable to the battery cell groups;
  a micro-controller operatively connected to the switching controllers, current sensing circuits, voltage sensing circuits and balancer circuits, the micro-controller being so configured as to:
    a—for each battery cell group, activate the switching controllers to apply a voltage from the power converters across the battery cell group until one condition selected from the group consisting of the voltage sensing circuit of a battery cell group sensing that the voltage exceeds a first threshold and the current sensing circuit of a battery cell group sensing that the current has dropped below a second threshold, is met;
    b—activate the voltage sensing circuits to verify that each of the predetermined number of battery cells has a similar voltage;
    c—when the verification of the voltage of the battery cells in step b determines that at least one battery cell has a voltage departing from the voltage of the other battery cells by more than a predetermine value, activate the balancer circuits to decrease the voltage of the other cells and return to step a.

The micro-controller of the power supply charger may be further so configured as to:
  d—for each battery cell group, activate the switching controller to apply a voltage from the power converter across the battery cell group until the current sensing circuit of the battery cell group senses that the current has dropped below a third threshold and stays below the third threshold for a predetermined period of time.

The foregoing and other objects, advantages and features of the present invention will become more apparent upon reading of the following non restrictive description of an illustrative embodiment thereof, given by way of example only with reference to the accompanying drawings.

DETAILED DESCRIPTION

Generally stated, a power supply charger according to an illustrative embodiment of the present invention may be used to charge power supplies comprising a number of individual cells in a balanced manner. For example, the power supply charger may be used to charge the power supply of an active prosthesis.

Figure 1:
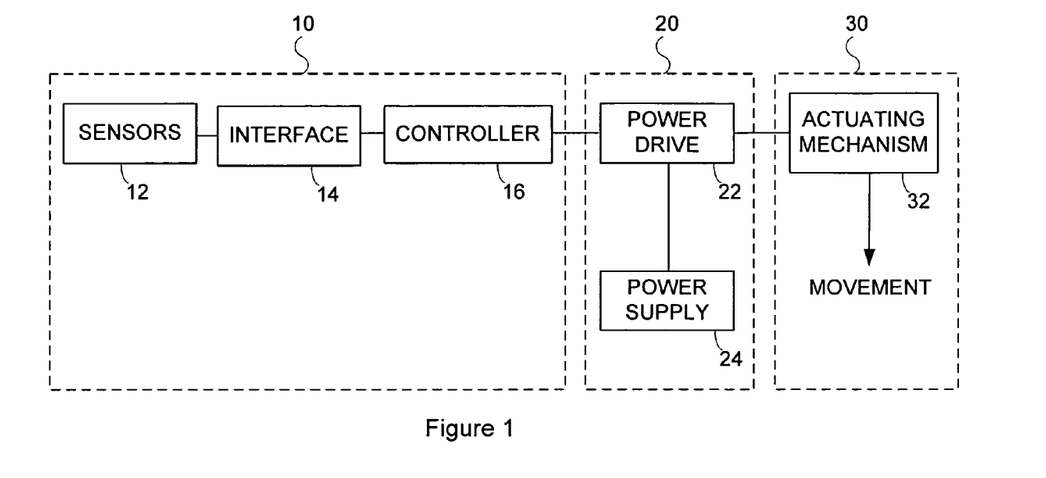
FIG. 1 is a block diagram showing a control system for a prosthesis having an actuating mechanism.

Referring to FIG. 1, a control system (10) controls the supply of electrical power from a power pack (20) to an active prosthesis (30). Unlike a conventional prosthesis, an active prosthesis (30) is designed to supply the mechanical energy necessary to move by itself. The purpose of the control system (10) is to provide the required signals to operate the actuating mechanism (32), for example an electric motor (not shown), of the active prosthesis (30) in the required manner. The control system (10) includes sensors (12), an interface (14) and a controller (16). The sensors (12) capture information, in real time, about the dynamics of the amputee's motion and provide that information to the controller (16) via the interface (14). The controller (16) determines the prosthesis joints trajectories and the required force or torque that must be applied by the actuating mechanism (32) in order to provide coordinated movements. The control system (10) then generates output signals which are used to regulate the power supplied to the actuating mechanism (32) from the power pack (20).

The power pack (20) includes a power drive (22) which is itself connected to a power supply (24) to supply energy to the actuating mechanism (32) in order to create the requirement movements.

An example of a control system using sensors that could be used herein is described in U.S. patent application Ser. No. 10/600,725 filed Jun. 20, 2003, entitled "CONTROL SYSTEM AND METHOD FOR CONTROLLING AN ACTUATED PROSTHESIS", by Stéphane Bédard, examples of active prosthesis that could be used herein are described in U.S. patent application Ser. No. 10/463,495 filed Jun. 17, 2003, entitled "ACTUATED PROSTHESIS FOR ABOVE-KNEE AMPUTEES", by Stéphane Bédard et al., and an example of a power supply that could be used herein is described in U.S. patent application Ser. No. 10/743,231 filed Dec. 22, 2003, entitled "COMPACT POWER SUPPLY", by Stéphane Bédard et al.

Figure 2:
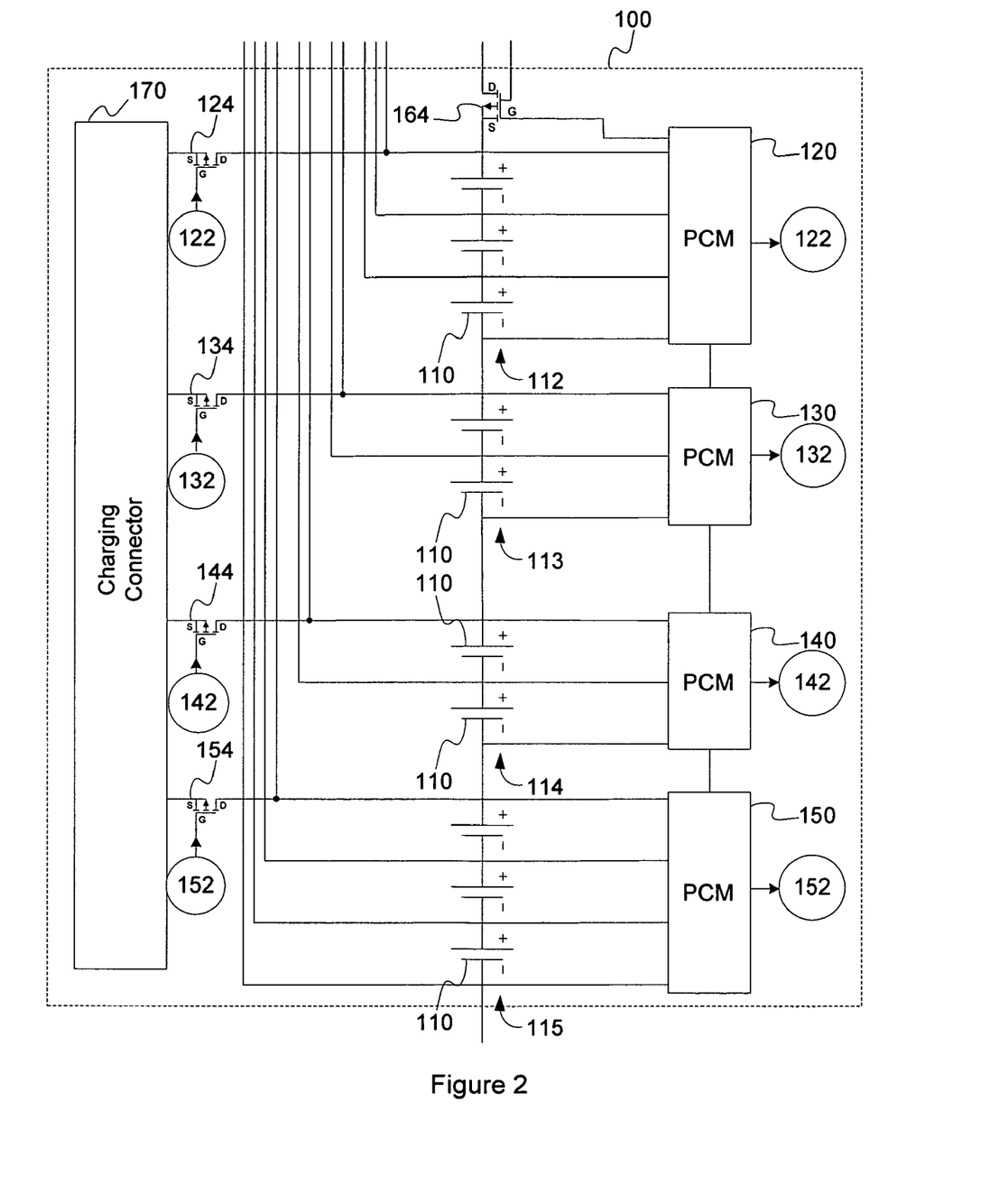
FIG. 2 is a schematic block diagram of a battery.

The power supply (24) has energy storage elements of different characteristics, namely a battery. Referring now to FIG. 2, there is shown an example of a battery (100) which includes ten battery cells (110), such as high-energy density Lithium Polymer cells, for example, but without limiting the present invention to that specific item. The cell SLPB36495-HD manufactured by Kokam Engineering has been found adequate. The battery cells (110) are advantageously configured serially, this arrangement allowing for a relatively high voltage to be used (nominal 37V, maximum 42V when fully charged) as well as allowing the use of high current.

The battery (100) should match the power supply requirements of the power drive (22) in order to deliver power within its operation range, thus, depending on the application, the number and configuration of the battery cells (110) may widely vary. The battery (100) further includes charging a connector (170) to connect the battery cells (110) to a power supply charger for recharging.

The battery cells (110) are monitored using Protector Circuit Modules (PCM) (120, 130, 140 and 150). Each individual PCM (120, 130, 140 and 150) monitors respective associated cell group (112, 113, 114 and 115), comprising, in the example shown, two or three battery cells (110) connected in series. The PCM measures voltages, charge and discharge currents.

In a charging mode, when a PCM (120, 130, 140 and 150) detects a noticeable voltage change or an over current condition, it protects the monitored battery cells (110) by disabling the use of its associated cell group (112, 113, 114 and 115) by controlling its associated charging protection switch (124, 134, 144 and 154) through respective control lines (122, 132, 142 and 152).

During a discharge mode, a detection of an adverse condition in one group of cells opens the discharging protection switch (164) to prevent further current supply. The PCM (120, 130, 140 and 150) returns to bypass mode (switches closed) when its associated cell group (112, 113, 114 and 115) reaches its protection release voltage or current.

It should be noted that the purpose of numerals 122, 132, 142 and 152 is only to clarify the connections within FIG. 2.

Power Supply Charger

Figure 3A:
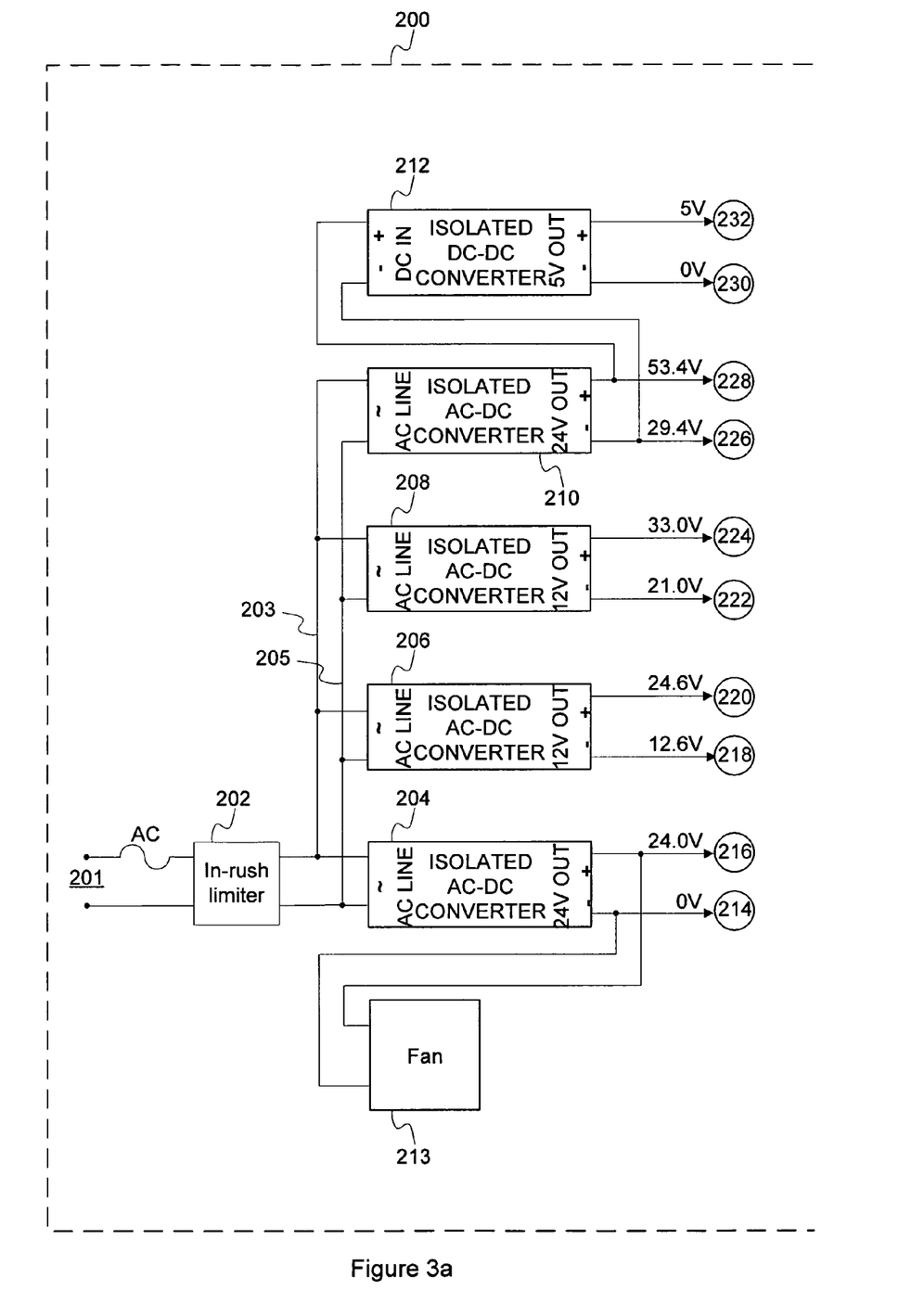
FIGS. 3a and 3b is a block diagram showing a power supply charger.
Figure 3B:
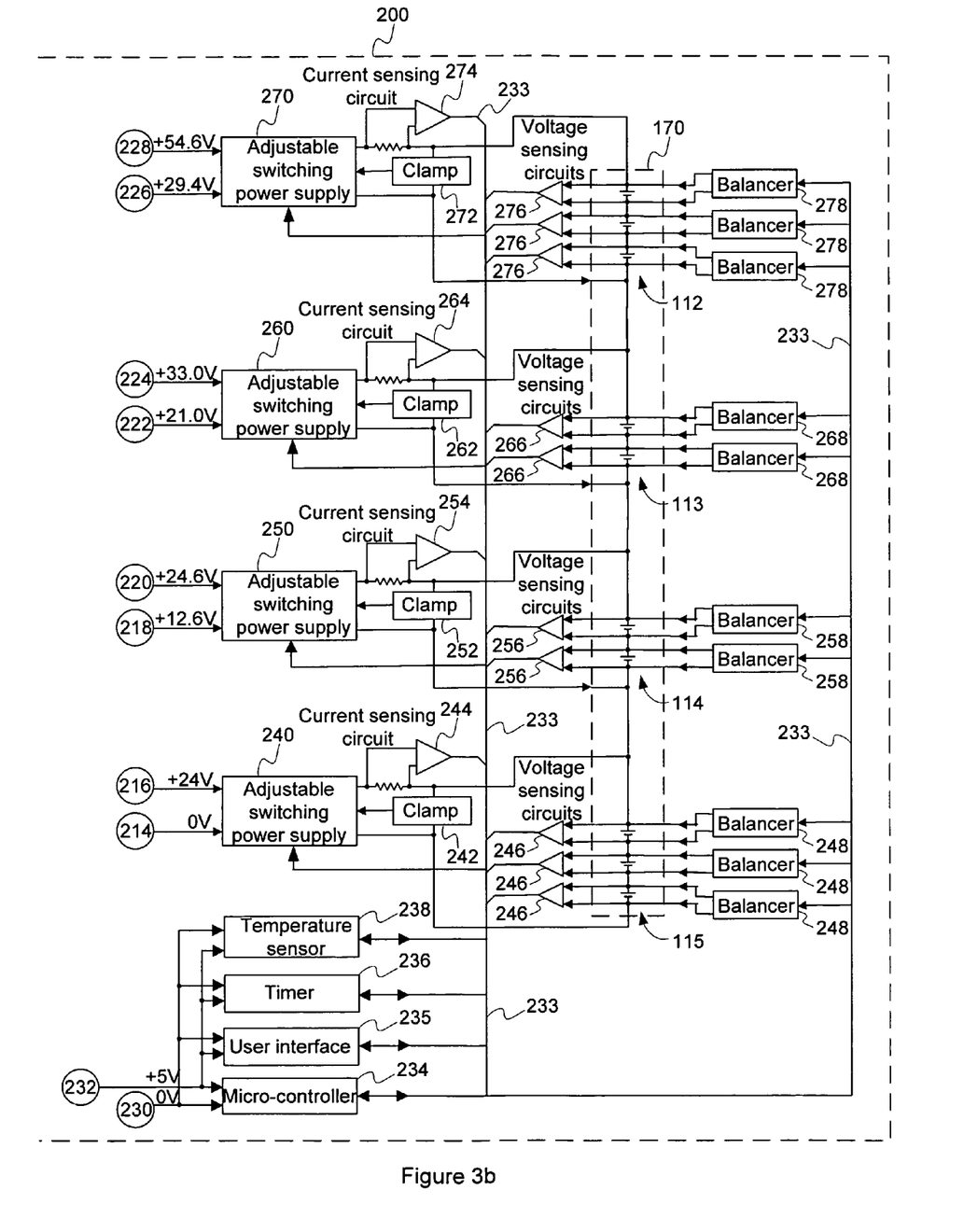

Referring to FIGS. 3a and 3b, there is shown an example of a power supply charger (200) that may be used to recharge the battery (100) of FIG. 2. The power supply charger (200) has four integrated switching controllers (240, 250, 260 and 270), such as, for example, but without limiting the present invention to that specific item, Linear Technology integrated circuit LT1510's. Using these constant-current and constant-voltage devices it may be possible to achieve 1% accuracy on charging voltage, which is the required precision for Li-Polymer cells. The integrated switching controllers (240, 250, 260 and 270) are powered by four isolated AC-DC converters (204, 206, 208 and 210), respectively. AC-DC converters (206, 208) having output voltages of 12 VDC while AC-DC converters (204, 210) having output voltages of 24 VDC. The AC-DC converters (204, 206, 208 and 210) convert the AC voltage at their input from the AC power source (201) via AC lines (203, 205). The integrated switching controllers (240, 270), powered by the 24 VDC AC-DC converters (204, 210), are used to recharge the cell groups (115, 112) comprising three cells (110) each while the integrated switching controllers (250, 260), powered by the 12 VDC AC-DC converters (206, 208), are used to recharge the cell groups (114, 113) comprising two cells (110) each.

The 12 VDC (206, 208) and 24 VDC (204, 210) AC-DC converters may be, for example, but without limiting the present invention to those specific items, MSMA-1502 and MSMA-0305 AC-DC converters, respectively, both from Astrodyne. The AC-DC converters (204, 206, 208 and 210) are protected by an in-rush limiter (202) against possible voltage fluctuations of the AC voltage provided at the power source input (201). The isolation of the integrated switching controllers (240, 250, 260 and 270) is advantageous because the cells (110) in the battery (100) are not isolated and because the voltage across groups of cells (110) is monitored by associated PCMs (150, 140, 130 and 120), as shown in FIG. 2.

In addition, a DC-DC converter (212), such as, for example, but without limiting the present invention to that specific item, a NDY2405 from C&D Technologies, is connected to the outputs of one of the 24 VDC AC-DC converters (210). The DC-DC converter (212) is used to power a microcontroller (234), a user interface (235), a timer (236) and a temperature sensor (238), the purpose and operation of these elements will be detailed further below. A fan (213) may be connected to the outputs of the other 24 VDC AC-DC converters (204) in order to control the internal temperature of the power supply charger (200).

Current sensing circuits (244, 254, 264 and 274) and voltage sensing circuits (246, 256, 266 and 276) constantly monitor the current through the cell groups (115, 114, 113 and 112) and voltage across the cells (110) of each cell group (115, 114, 113 and 112). The information about the various currents and voltages is supplied to the individual integrated switching controllers (240, 250, 260 and 270) and to the micro-controller (234) through the control bus (233).

In the event of abnormal current or voltage situations, the integrated switching controllers (240, 250, 260 and 270) may cut power to their respective associated cell group (115, 114, 113 and 112) using corresponding clamping circuits (242, 252, 262 and 272). Each of the cell group (115, 114, 113 and 112) also has balancer circuits (248, 258, 268 and 278) associated to the cells (110) of each cell group (115, 114, 113 and 112), respectively, which are controlled by the micro-controller (234) via the control line (233). Each balancer circuit (248, 258, 268 and 278) includes a resistive load and a switch circuit allowing the connection of the resistive load to the associated cell (110) in order to discharge it. When the micro-controller (234) detects an imbalance condition, for example some cells (110) charge faster than others; the charging process is interrupted and the balancer circuits (248, 258, 268 and 278) are activated.

It should be noted that the purpose of numerals 214, 216, 218, 220, 222, 224, 226, 228, 230 and 232 is only to clarify the connections between FIGS. 3a and 3b.

Micro-Controller

The micro-controller (234) includes an algorithm that continuously monitors the current and voltage of each cell (110) using the current sensing circuits (244, 254, 264 and 274) and voltage sensing circuits (246, 256, 266 and 276) in order to diagnose and report cell malfunctions as well as monitor charging and balancing processes. An example of an algorithm that may be executed by the micro-controller (234) is depicted by the flow diagram shown in FIG. 4. The operations of the algorithm are indicated by blocks (302) to (346).

Figure 4:
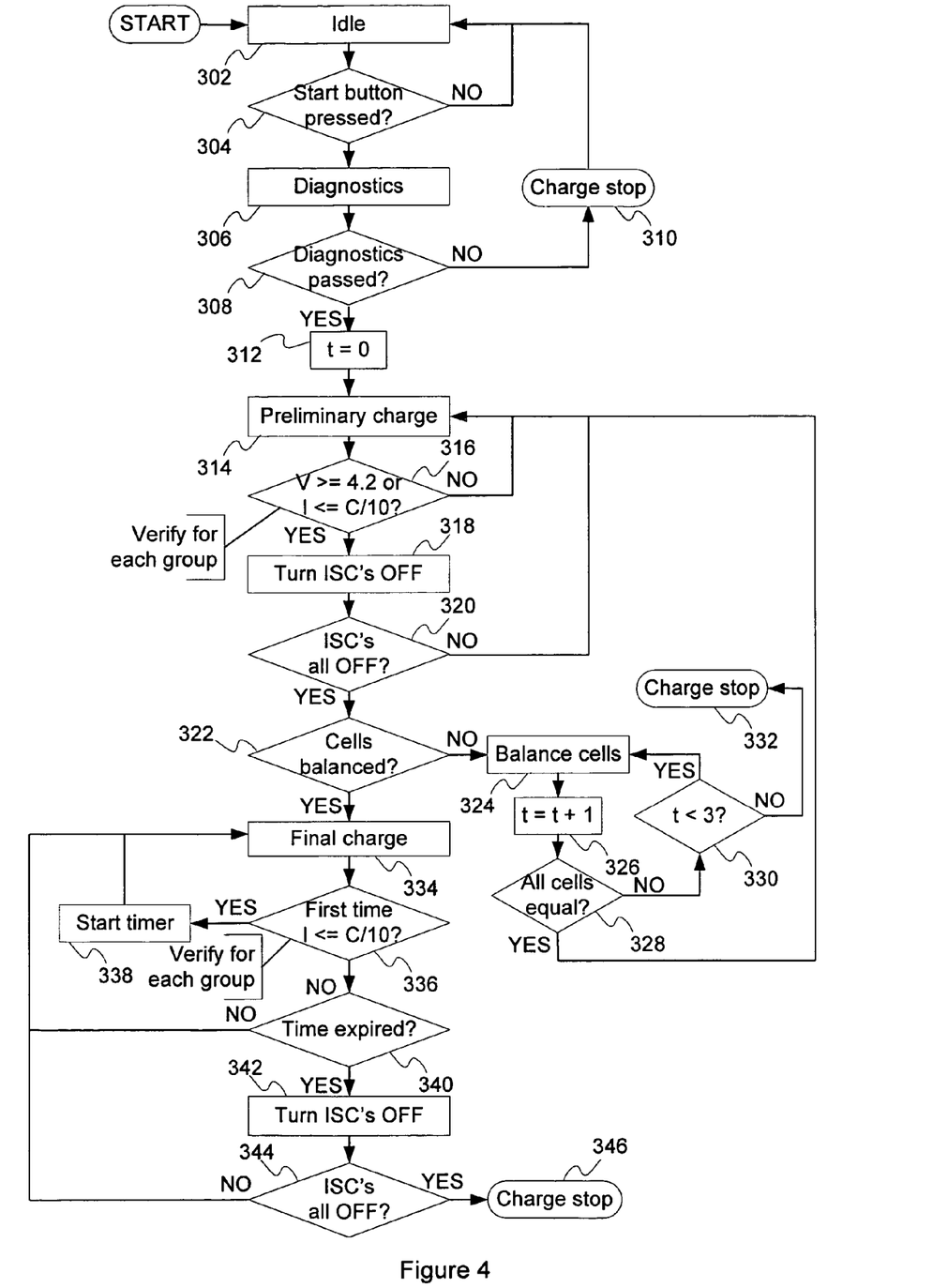
FIG. 4 is a flow diagram of a charging algorithm.

At block (302) the algorithm starts in an idle state, verifying at block (304) if, for example, a start button (not shown) on the user interface (235) has been pressed. Once the start button is activated, the algorithm starts the charging process by initiating, at block (306), a diagnostics routine which will be further detailed below with reference to FIG. 5. Then, at block (308), the algorithm checks to see of the diagnostics routine has successfully completed, if not, it goes to block (310) where the charging process is interrupted and then proceeds to block (302), reports an error condition through the user interface (235) where it goes back to the idle state.

If the diagnostics routine is successful, the algorithm goes to block (312) where the preliminary charge routine starts by initializing, charge cycle counter and then, at block (314), activating all of the integrated switching controllers (240, 250, 260 and 270). At block (318), the algorithm verifies, for each cell group (115, 114, 113 and 112), if the voltage reaches 4.2V or if the current goes under C/10, C being a current corresponding to a nominal capacity of the battery cells (100). If not, it goes back to block (314) and continues the preliminary charge routine until one of the conditions is met. Once this occurs for one of the cell groups (115, 114, 113 and 112), the algorithm proceeds to block (318) where the corresponding integrated switching controller (240, 250, 260 and 270) is turned off. The algorithm then verifies, at block (320) if all of the integrated switching controllers (240, 250, 260 and 270) have been turned off, if not, it goes back to block (314) and continues the preliminary charge routine.

When all of the integrated switching controllers (240, 250, 260 and 270) have been turned off, the balancing routine begins at block (322) by verifying if the cells (110) are balanced, i.e. if the voltage difference between any cells (110) is below a preset level, for example 0.005V. If not, the algorithm starts the balancing routine by identifying, at block (324), the lowest voltage cell (110) and then lowering the voltage of the other cells (110) by activating their respective balancer circuits (248, 258, 268 and 278) until the voltage reaches the identified cell's (110) voltage. At block (326), the charge cycle counter is increased and at block (328), the algorithm verifies once more if the voltage difference between any cells (110) is below the preset level. If so, the algorithm goes back to block (314) where a new preliminary charge routine starts. If not, the algorithm verifies, at block (330), if the value of the charge cycle counter is above a preset number of cycles, for example three, in order to prevent the algorithm from going into an endless loop. If the value of the charge cycle counter is above a preset number, then the algorithm goes to block (332), reports an error condition through the user interface (235) and interrupts the charging process. In an alternative embodiment the charge cycle counter may be replaced by a charge cycle timer that will terminate the charging process after a specified amount of time.

Going back to block (322), if the voltage difference between all cells (110) is below the preset level, the algorithm proceeds to block (334) and starts the final charge routine. At this point, the cells (110) are nearly completely charged and are sufficiently balanced. Each integrated switching controller (240, 250, 260 and 270) is activated until its associated cell group (115, 114, 113 and 112) current falls below C/10. Then, at block (336), the algorithm verifies, for each cell group (115, 114, 113 and 112) who's current has fallen below C/10 and if it is the first time its current falls below C/10, if so, it then starts, at block (338), a separate timer (236) for each cell group (115, 114, 113 and 112) meeting that condition and goes back to the beginning of the final charge routine at block (334). If it is not the first time that the cell group (115, 114, 113 and 112) current falls below C/10, the algorithm then goes to block (340) and verifies if a predetermined time as expired, for example the timer of block (338) may be set to 10 minutes. If the time has not expired, the algorithm then goes back to the beginning of the final charge routine at block (334). If the time has expired, the algorithm then proceeds to block (342) where the integrated switching controller (240, 250, 260 and 270) associated with the cell group (115, 114, 113 and 112) who's time as expired is turned off.

Finally, at block (344), the algorithm verifies if all of the integrated switching controllers (240, 250, 260 and 270) have been switched off, if it is the case, then, at block (346), the charging process is ended and its completion is reported through the user interface (235). On the other hand, if not all of the integrated switching controllers (240, 250, 260, 270) have been turned off, the algorithm goes back to the beginning of the final charge routine at block (334).

It is to be understood that in an alternative embodiment, the timer (236) may also be implemented within the micro-controller (234).

Diagnostics Routine

Figure 5:
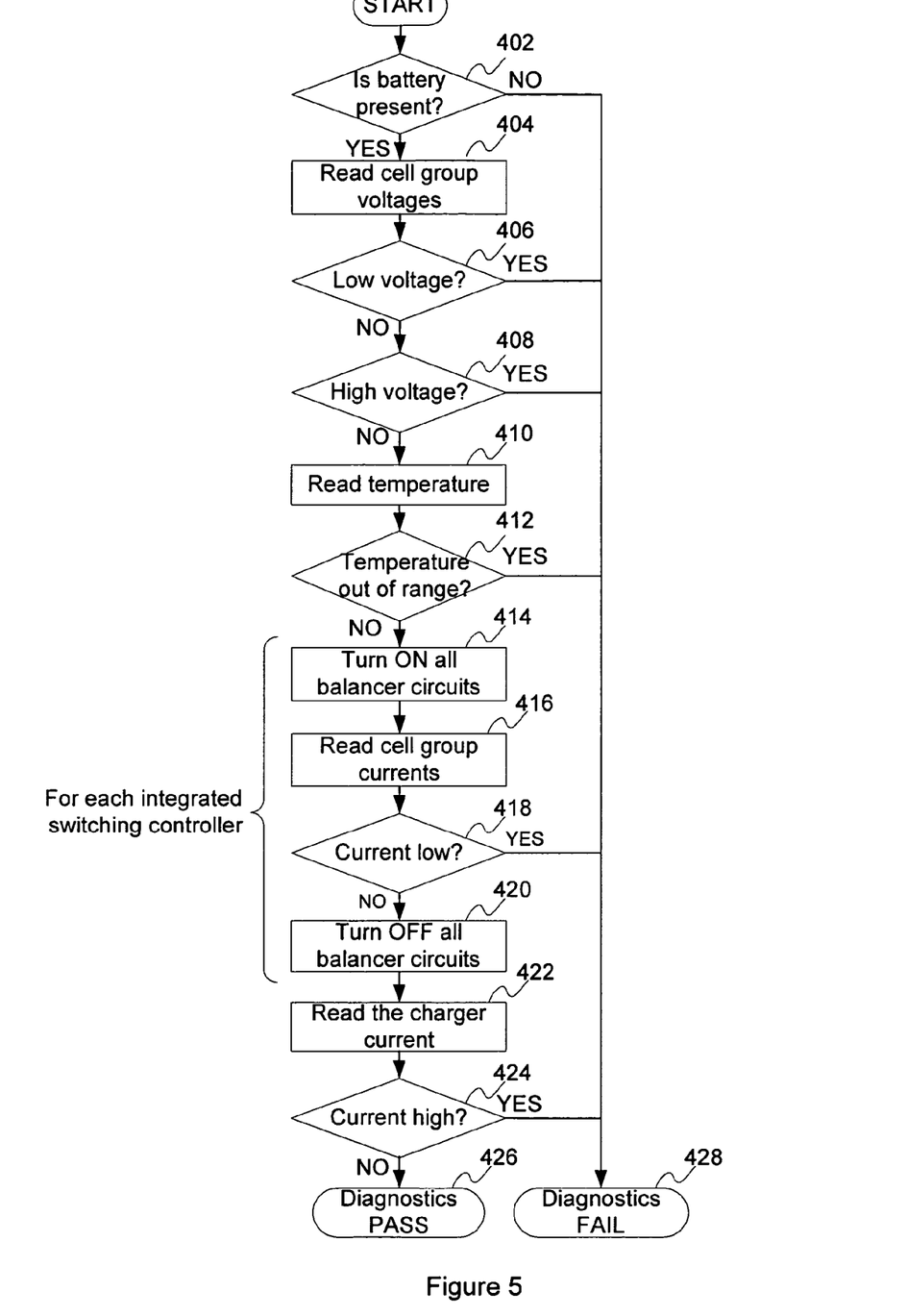
FIG. 5 is a flow diagram of diagnostics algorithm.

The algorithm for the diagnostics routine of block (306), from FIG. 4, is depicted by the flow diagram shown in FIG. 5. The operations of the algorithm are indicated by blocks (402) to (428).

At block (402) the algorithm starts by verifying if a battery (100) is present, if not, the algorithm goes to block (428) and the diagnostics routine returns a fail. If there is a battery (100) present, the voltages of all the cell groups (115, 114, 113 and 112) of the battery (100) are read at block (404) and, at block (406), the algorithm verifies if any voltage is below a preset level, for example 1.000V. If so, the algorithm goes to block (428) and the diagnostics routine returns a fail. If not, the algorithm then verifies, at block (408), if any voltage is higher than a preset level, for example 4.235V. If so, the algorithm goes to block (428) and the diagnostics routine returns a fail.

At block (410), the algorithm reads the temperature of the charger (200) using the temperature sensor (238) in order to verify, at block (412), if the temperature of the charger (200) is out of range, for example below 0° C. or above 45° C. If so, the algorithm goes to block (428) and the diagnostics routine returns a fail.

Then, at block (414), for each integrated switching controller (240, 250, 260 and 270), the associated balancer circuits (248, 258, 268 and 278) are turned on and the current of each cell groups (115, 114, 113 and 112) is read at block (416). Then, at block (418), the algorithm verifies if the current is below C/10, if so, the algorithm goes to block (428) and the diagnostics routine returns a fail. If not, at block (420), the balancer circuits (248, 258, 268 and 278) are turned off and the algorithm proceeds to block (422) where the charger (200) current is read. At block (424), the algorithm then verifies if the current is greater than a preset level, for example 0.6C, if so the algorithm goes to block (428) and the diagnostics routine returns a fail. If not, the algorithm proceeds to block (426) and diagnostics routine returns a pass. Whenever the diagnostics routine returns a fail, information regarding the cause of failure may be provided to the user interface (235) in order to inform the user of the cause of failure.

It is to be understood that the present invention is not limited to its use with a power supply for an active prosthesis, other power supplies having lithium-ion cells, such as, for example, power supplies for cordless power tools, hobby planes and race carts, may also benefit from the above describe power supply charger. As well, other types of batteries may be recharged using the present invention, for example nickel-metal-hydride or nickel-cadmium batteries, or any other battery that require constant-current and/or constant-voltage charging.

Although the present invention has been described by way of a non-limitative illustrative embodiment and example thereof, it should be noted that it will be apparent to persons skilled in the art that modifications may be applied to the present illustrative embodiment without departing from the scope of the present invention.

What is claimed is:

1. A method of charging battery cells divided into at least two battery cell groups, each battery cell group having an associated protector circuit module, the method comprising the steps of:
   (a) for each battery cell group, applying a voltage across the battery cell group until one condition selected from the group consisting of the voltage of one of the battery cells exceeding a first threshold and the current across the battery cell group dropping below a second threshold, is met;
   (b) for each battery cell group, verifying that each of the of battery cells of the battery cell group has a similar voltage;
   (c) when the verification of the battery cells voltage in step b determines that at least one battery cell of the battery cell group has a voltage departing from the voltage of the other battery cells of the battery cell group by more than a predetermine value, decreasing the voltage of the other battery cells and returning to step a.

2. A method according to claim 1, wherein the first threshold is set to 4.2V.

3. A method according to claim 1, wherein the second threshold is set to C/10, C being a current corresponding to a nominal capacity of the battery cells.

4. A method according to claim 1, further comprising the step of:
   (d) for each battery cell group, applying a voltage across the battery cell group until the current across the battery cell group drops below a third threshold and stays below the third threshold for a predetermined period of time.

5. A method according to claim 4, wherein the third threshold is set to C/10, C being a current corresponding to a nominal capacity of the battery cells.

6. A method according to claim 4, wherein the predetermined period of time is set to 10 minutes.

7. A method according to claim 1, wherein step c is repeated up to a predetermined maximum number of times.

8. A method according to claim 7, wherein the predetermined maximum number of times is 3.

9. A method according to claim 1, further comprising before step a the steps of:
   (i) detecting the presence of at least one battery cell;
   (ii) when the detection of the presence of at least one battery cell of step i fails, reporting an error condition and terminating the charging of the power supply.

10. A method according to claim 1, further comprising before step a the steps of:
    (i) measuring the voltage of each battery cell group;
    (ii) when the measured voltage of at least one battery cell group of step i meets one condition selected from a group consisting of the voltage of a battery cell group being below a fourth threshold and the voltage of a battery cell group exceeding a fifth threshold, reporting an error condition and terminating the charging of the power supply.

11. A method according to claim 10, wherein the fourth threshold is set to 1V.

12. A method according to claim 10, wherein the fifth threshold is set to 4.235V.

13. A method according to claim 1, further comprising before step a the steps of:
    (i) measuring the temperature of the battery cells;
    (ii) when the measured temperature of step i meets one condition selected from a group consisting of the temperature being below a sixth threshold and the temperature exceeding a seventh threshold, reporting an error condition and terminating the charging of the power supply.

14. A method according to claim 13, wherein the sixth threshold is set to 0° C.

15. A method according to claim 13, wherein the seventh threshold is set to 45° C.

16. A method according to claim 1, further comprising before step a the steps of:
    (i) measuring the current through each battery cell group;
    (ii) when the measured current of at least one battery cell group of step i is below an eight threshold, reporting an error condition and terminating the charging of the power supply.

17. A method according to claim 16, wherein the eighth threshold is set to C/10, C being a current corresponding to a nominal capacity of the battery cells.

18. A method according to claim 1, further comprising before step a the steps of:
    (i) measuring the current through all battery cell groups;
    (ii) when the measured current through all battery cell groups of step i exceeds a ninth threshold, reporting an error condition and terminating the charging of the power supply.

19. A method according to claim 18, wherein the ninth threshold is set to 0.6C, C being a current corresponding to a nominal capacity of the battery cells.

20. A power supply charger for charging battery cells divided into at least two battery cell groups, each battery cell group having an associated protector circuit module, the power supply charger comprising:

a power source input configured to be connected to a power source;

for each battery cell group:
- a power converter connected to the power source input;
- a constant-current and constant-voltage device connected to the power converter for selectively applying a voltage from the power converter across the battery cell group;
- a current sensing circuit for sensing the current through the cell group;
- terminals configured to connect the constant-current and constant-voltage device and the current sensing circuit to the battery cell group;
- for each battery cell of the battery cell group:
  - a voltage sensing circuit for sensing the voltage across the battery cell;
  - a balancer circuit for decreasing the voltage of the battery cell;
  - terminals configured to connect the voltage sensing circuit and the balancer circuit to the battery cell;
- a micro-controller operatively connected to the constant-current and constant-voltage devices, current sensing circuits, voltage sensing circuits and balancer circuits, the micro-controller being so configured as to:
  - (a) for each battery cell group, activate the constant-current and constant-voltage device to apply a voltage from the power converter across the battery cell group until one condition selected from the group consisting of the voltage sensing circuit of one of the battery cells of the battery cell group sensing that the voltage exceeds a first threshold and the current sensing circuit of the battery cell group sensing that the current has dropped below a second threshold, is met;
  - (b) for each battery cell group, activate the voltage sensing circuits to verify that each of the battery cells of the battery cell group has a similar voltage;
  - (c) when the verification of the voltage of the battery cells in step b determines that at least one battery cell of the battery cell group has a voltage departing from the voltage of the other battery cells of the battery cell group by more than a predetermine value, activate the balancer circuits to decrease the voltage of the other battery cells of the battery cell group and return to step a.

21. A power supply charger according to claim 20, wherein the first threshold is set to 4.2V.

22. A power supply charger according to claim 20, wherein the second threshold is set to C/10, C being a current corresponding to a nominal capacity of the battery cells.

23. A power supply charger according to claim 20, the microcontroller being further so configured as to:
  (d) for each battery cell group, activate the constant-current and constant-voltage device to apply a voltage from the power converter across the battery cell group until the current sensing circuit of the battery cell group senses that the current has dropped below a third threshold and stays below the third threshold for a predetermined period of time.

24. A power supply charger according to claim 23, wherein the third threshold is set to C/10, C being a current corresponding to a nominal capacity of the battery cells.

25. A power supply charger according to claim 23, wherein the predetermined period of time is set to 10 minutes.

26. A power supply charger according to claim 20, wherein step c is repeated up to a predetermined maximum number of times.

27. A power supply charger according to claim 26, wherein the predetermined maximum number of times is 3.

28. A power supply charger according to claim 20, further comprising a user interface operatively connected to the micro-controller for operating the power supply charger and reporting a status of the power supply charger to the user.

29. A power supply charger according to claim 28, the micro-controller being further so configured as to:
  (i) detect the presence of at least one battery cell;
  (ii) when the detection of the presence of at least one battery cell of step i fails, report an error condition through the user interface and terminate the charging of the power supply.

30. A power supply charger according to claim 28, the micro-controller being further so configured as to:
  (i) activate the voltage measuring circuits to measure the voltage of each battery cell group;
  (ii) when the measured voltage of at least one battery cell group of step i meets one condition selected from a group consisting of the voltage of a battery cell group being below a fourth threshold and the voltage of a battery cell group exceeding a fifth threshold, report an error condition through the user interface and terminate the charging of the power supply.

31. A power supply charger according to claim 30, wherein the fourth threshold is set to IV.

32. A power supply charger according to claim 30, wherein the fifth threshold is set to 4.235V.

33. A power supply charger according to claim 28, further comprising a temperature sensor operatively connected to the micro-controller, the micro-controller being further so configured as to:
  (i) activate the temperature sensor to measure the temperature of the power supply charger;
  (ii) when the measured temperature of step i meets one condition selected from a group consisting of the temperature being below a sixth threshold and the temperature exceeding a seventh threshold, report an error condition through the user interface and terminate the charging of the power supply.

34. A power supply charger according to claim 33, wherein the sixth threshold is set to 0° C.

35. A power supply charger according to claim 33, wherein the seventh threshold is set to 45° C.

36. A power supply charger according to claim 28, the micro-controller being further so configured as to:
  (i) activate the current sensing circuits to measure the current of each battery cell group;
  (ii) when the measured current of at least one battery cell group of step i is below an eight threshold, report an error condition through the user interface and terminate the charging of the power supply.

37. A power supply charger according to claim 36, wherein the eighth threshold is set to C/10, C being a current corresponding to a nominal capacity of the battery cells.

38. A power supply charger according to claim 28, the micro-controller being further so configured as to:
  (i) activate the current sensing circuits to measure the current through all battery cell groups;
  (ii) when the measured current through all battery cell groups of step i exceeds a ninth threshold, report an error condition through the user interface and terminate the charging of the power supply.

39. A power supply charger according to claim 38, wherein the ninth threshold is set to 0.6C, C being a current corresponding to a nominal capacity of the battery cells.

40. A power supply charger according to claim 20, further comprising an in-rush limiter connected between the power source input and the power converter of each battery cell group.

41. A power supply charger according to claim 20, further comprising a fan connected to the power source input for reducing the temperature of the power supply charger.

42. A power supply charger according to claim 41, wherein the fan is operatively connected to the micro-controller.

* * * * *

UNITED STATES PATENT AND TRADEMARK OFFICE
CERTIFICATE OF CORRECTION

| | | |
|---|---|---|
| PATENT NO. | : 7,786,699 B2 | Page 1 of 1 |
| APPLICATION NO. | : 11/339742 | |
| DATED | : August 31, 2010 | |
| INVENTOR(S) | : Demers et al. | |

It is certified that error appears in the above-identified patent and that said Letters Patent is hereby corrected as shown below:

In Column 2, Line 49, change "charger." to --charger;--.

In Column 7, Line 43 (approx.), in Claim 1, change "the of" to --the--.

In Column 7, Line 55 (approx.), in Claim 3, change "C/l0," to --C/10,--.

In Column 7, Line 64 (approx.), in Claim 5, change "C/l0," to --C/10,--.

In Column 8, Line 51, in Claim 17, change "C/l0," to --C/10,--.

In Column 9, Line 49, in Claim 22, change "C/l0," to --C/10,--.

In Column 9, Line 52, in Claim 23, change "microcontroller" to --micro-controller--.

In Column 9, Line 61, in Claim 24, change "C/l0," to --C/10,--.

In Column 10, Line 27, in Claim 31, change "IV." to --1V.--.

In Column 10, Line 58 (approx.), in Claim 37, change "C/l0," to --C/10,--.

Signed and Sealed this
Fifteenth Day of March, 2011

David J. Kappos
*Director of the United States Patent and Trademark Office*